(12) United States Patent
Chillar et al.

(10) Patent No.: US 8,337,597 B2
(45) Date of Patent: Dec. 25, 2012

(54) MOISTURE DIVERSION APPARATUS FOR AIR INLET SYSTEM AND METHOD

(75) Inventors: Rahul Jaikaran Chillar, Marietta, GA (US); Adil Ansari, Kennesaw, GA (US)

(73) Assignee: General Electric Company, Schenectady, NY (US)

(*) Notice: Subject to any disclaimer, the term of this patent is extended or adjusted under 35 U.S.C. 154(b) by 31 days.

(21) Appl. No.: 13/022,020

(22) Filed: Feb. 7, 2011

(65) Prior Publication Data

US 2012/0199001 A1    Aug. 9, 2012

(51) Int. Cl.
*B01D 45/00* (2006.01)

(52) U.S. Cl. ............... 95/267; 95/273; 95/287; 55/482; 55/485; 55/428; 55/495; 55/462; 55/497; 55/501; 55/511; 55/DIG. 17; 55/DIG. 18; 96/108

(58) Field of Classification Search ............... 55/482, 55/485, 428, 495, 497, 501, 511, DIG. 17, 55/DIG. 18, 462, 465; 95/273, 287; 96/108
See application file for complete search history.

(56) References Cited

U.S. PATENT DOCUMENTS

| | | | | |
|---|---|---|---|---|
| 3,564,820 | A | * | 2/1971 | Nelson ........................ 96/392 |
| 4,714,054 | A | * | 12/1987 | Minard et al. ............... 122/483 |
| 6,368,386 | B1 | * | 4/2002 | Nelson et al. ................ 95/268 |
| 6,875,256 | B2 | * | 4/2005 | Gillingham et al. .......... 95/273 |
| 7,632,339 | B2 | | 12/2009 | Singh |
| 7,905,947 | B2 | * | 3/2011 | Leseman et al. .............. 95/273 |
| 2007/0144121 | A1 | * | 6/2007 | Allan ........................... 55/444 |
| 2008/0314009 | A1 | * | 12/2008 | Ziebold et al. ............... 55/485 |
| 2010/0000409 | A1 | * | 1/2010 | Alper ........................... 95/143 |

* cited by examiner

*Primary Examiner* — Jason M Greene
*Assistant Examiner* — Dung H Bui
(74) *Attorney, Agent, or Firm* — Hiscock & Barclay LLP

(57) ABSTRACT

A moisture diversion system for a gas turbine inlet. The moisture diversion system comprises a housing that is operably connected with a gas turbine and defines an opening through which air flows to the gas turbine. A hood is attached to the housing adjacent the opening. The hood has a surface disposed at an acute angle relative to horizontal. A device is disposed relative to the hood to separate moisture from air flowing through the device. Separated moisture is directed onto the hood. A gutter is disposed adjacent an edge of the hood to collect moisture from the hood. A conduit is fluidly connected with the gutter to conduct water away from the gutter and the opening in the housing to inhibit separated moisture from re-entering the air flow through the opening to the gas turbine.

17 Claims, 3 Drawing Sheets

Page 1

MOISTURE DIVERSION APPARATUS FOR AIR INLET SYSTEM AND METHOD

BACKGROUND OF THE INVENTION

The present invention relates generally to an air inlet system. In particular, the present invention relates to an apparatus and method for diverting moisture away from air flowing through the air inlet system and into a gas turbine.

Gas turbine inlet air systems are known. One such known system includes a housing supporting an array of filters that remove particulates from the inlet air stream. The housing has at least one opening and a hood located adjacent the opening. There is typically structure in the hood or in the vicinity of the hood to remove moisture from the inlet air stream. Such structure removes moisture from the inlet air stream and form droplets. The droplets generally fall onto another hood below and towards the ground.

Such known gas turbine filter systems allow moisture to re-enter the inlet air stream, into the housing and ultimately into the gas turbine. Moisture can damage components of the gas turbine. Accordingly, there is a need for improvements to air inlet systems that minimize or eliminate the amount of moisture that can re-enter the inlet air stream and flow to the gas turbine.

BRIEF DESCRIPTION OF THE INVENTION

The invention provides moisture diversion for filter systems to inhibit moisture that has been separated from an air flow from re-entering the air flow. One aspect of the invention is a moisture diversion system for a gas turbine inlet. The moisture diversion system comprises a housing that is operably connected with a gas turbine and defines an opening through which air flows to the gas turbine. A hood is attached to the housing adjacent the opening. The hood has a surface disposed at an acute angle relative to horizontal. A device is disposed relative to the hood to separate moisture from air flowing through the device. Separated moisture is directed onto the hood. A gutter is disposed adjacent an edge of the hood to collect moisture from the hood. A conduit is fluidly connected with the gutter to conduct water away from the gutter and the opening in the housing to inhibit separated moisture from re-entering the air flow through the opening to the gas turbine.

Another aspect of the invention is a method of diverting moisture from inlet air flowing to a gas turbine. The method comprises the steps of providing a housing operably connected with a gas turbine and that defines an opening through which air flows to the gas turbine. A hood is attached to the housing adjacent the opening. The hood has a surface disposed at an acute angle relative to horizontal. Moisture is separated from the air flow. Separated moisture is agglomerated into a drop so the drop falls onto the hood. A gutter is disposed adjacent an edge of the hood to collect drops of moisture from the hood. Moisture is conducted away from the gutter and the opening in the housing with a conduit fluidly connected with the gutter to inhibit separated moisture from re-entering the air flow through the opening to the gas turbine.

Another aspect of the invention is a moisture diversion structure for an inlet air system. The moisture diversion structure comprises a housing that defines an opening through which air flows. A hood is attached to the housing adjacent the opening. The hood has a surface disposed at an acute angle relative to horizontal. A device is disposed above the hood to separate moisture from air flowing through the device. Separated moisture agglomerates into a drop incapable of being carried by the flow of air so the drop falls onto the hood. A gutter is disposed adjacent a lowermost edge of the hood to collect drops of moisture from the hood. A conduit is fluidly connected with the gutter to conduct water away from the gutter and the opening in the housing to inhibit separated moisture from re-entering the air flow through the opening.

DESCRIPTION OF THE DRAWINGS

Further features of the invention will become apparent to those skilled in the art to which the invention relates from reading the following detailed description of the invention with reference to the accompanying drawings, in which.

DETAILED DESCRIPTION OF THE INVENTION

Figure 1:
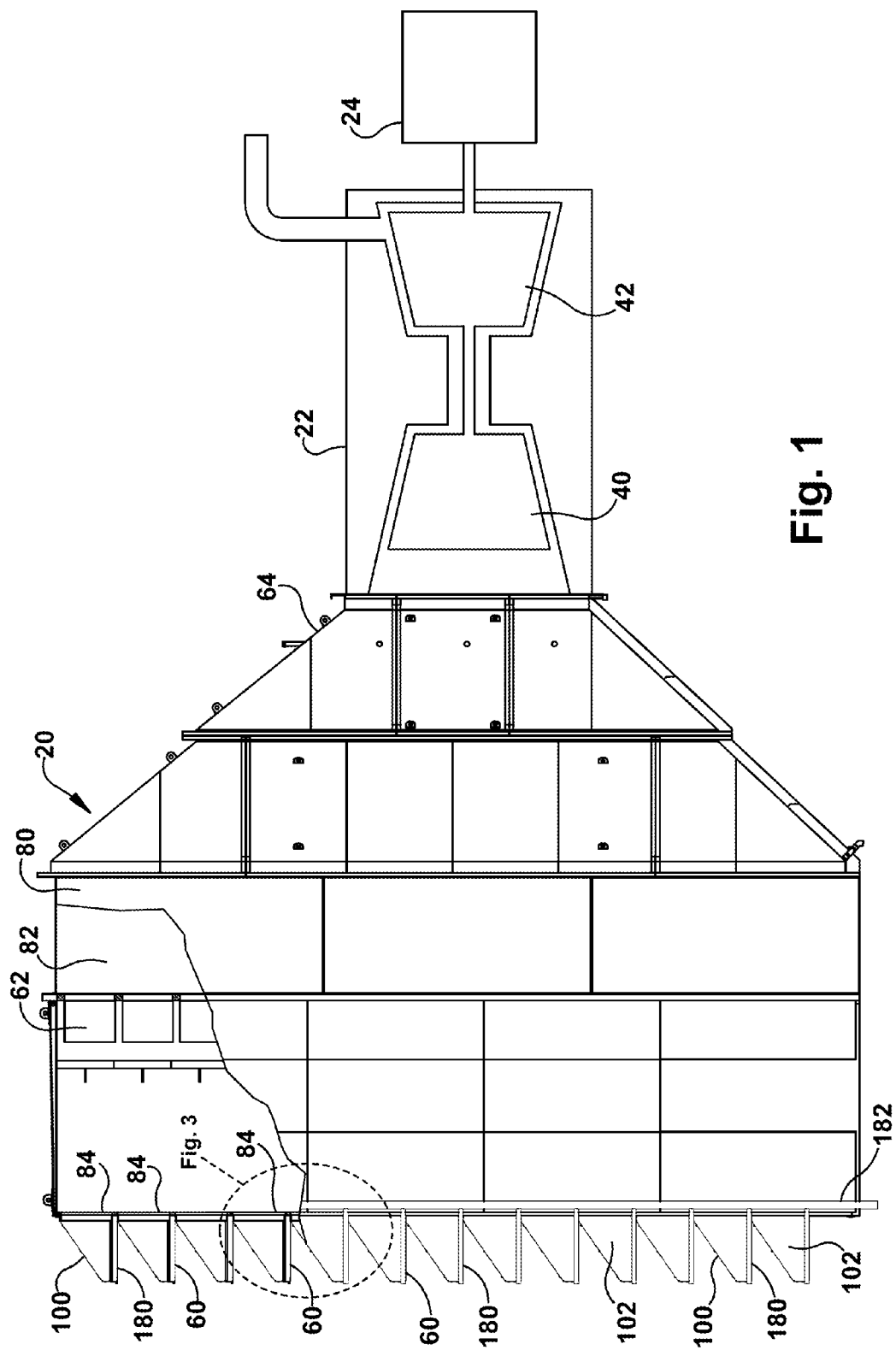
FIG. 1 is a schematic view, partly in section, of a moisture removal system, constructed according to one aspect of the invention, used with a gas turbine air inlet system.

An air inlet system 20 constructed according to one aspect of the invention for filtering inlet air of a gas turbine 22 is illustrated in FIG. 1. The gas turbine 22 can be used for any desired purpose, such as powering an electrical generator 24. The gas turbine 22 uses a relatively large quantity of air that flows through the air inlet system 20. The air flow is then directed to a compressor portion 40 of the gas turbine 22, gets ignited and where expanding gases ultimately drive a turbine portion 42 of the gas turbine. The large quantity of inlet air is preferably filtered in the air inlet system 20 of particulates, salt and moisture in order to prevent damage and accelerated wear to components of the gas turbine 22, such as blades, vanes and nozzles.

Various aspects of the invention are described with respect to an inlet system 20 for a gas turbine 22. It will be appreciated that the aspects of the invention are also applicable to a variety of other applications in which moisture and particulates are undesirable. For example, the various aspects of the present invention are applicable to applications such as internal combustion engine intake systems, clean room intake systems, heating ventilating and air conditioning (HVAC) systems, hospital HVAC systems and air compressor intake systems.

Moisture contamination is particularly problematic in environments having relatively high humidity, such as in marine or off-shore applications, or in conditions such as rain, mist or fog. If the air flowing through the air inlet system 20 is relatively humid, the moist air can overwhelm filter media located in the air inlet system and pass through the filter media. This moisture laden air can cause substantial problems with performance of the gas turbine 22 and can damage components of the gas turbine.

Separation of moisture from the air flowing through the air inlet system 20 and inhibiting moisture from re-entering the air flowing through the air inlet system is a particular problem addressed by at least one aspect of the invention. It is well known that light rain, mist and fog create very small moisture droplets that are easily carried in a fast moving stream of air, such as inlet air for a gas turbine 22. Generally, heavy rain has drops that are relatively too large to be easily carried in a flow of air. However fast moving air can separate some moisture from even the heaviest and largest of rain drops.

According to one aspect of the invention, moisture removal and improved diversion is provided for the air inlet system 20.

The illustrated air inlet system 20 typically includes a first stage or moisture removal device 60 (FIGS. 1 and 3) and a second stage or primary filter 62 positioned downstream from the moisture removal device. It will be apparent that other stages and devices could be used without departing from the scope of the invention. Ducting 64 directs filtered air from the air inlet system 20 to the gas turbine 22.

The air inlet system 20 includes a housing 80 that defines a chamber 82. The housing 80 has a plurality of openings 84 (FIG. 3) that function as an entrance for air to flow through. The housing 80 is constructed of any suitable material, such as metal framing and sheet. The housing 80 can be constructed to have a relatively small footprint. This results because the chamber 82 does not have to provide for collection areas for moisture separated from the air flow since the majority of the moisture removal is accomplished outside of the housing 80.

Inlet air enters the housing 80 through the moisture removal device 60 and the openings 84. The housing 80 supports the primary air filter 62. The primary filter 62 functions mainly to remove particulates from the inlet air that could be harmful to the gas turbine 22. The primary filter 62 can be of any suitable construction, but is illustrated as an array of V-cell filter assemblies. The primary filters 62 are made from any suitable material selected for the application and environment that they are used in. It will be appreciated that any suitable filter construction may be used as the primary filter 62, such as without limitation pockets, panels, cartridges and/or bags.

The primary filters 62 preferably have relatively high filtering efficiencies with respect to particulate material. The primary filters 62 may be of any suitable construction and made from any suitable media. For example, primary filters 62 having filtration efficiencies in the range of 65-75%, or greater than 65% may be used.

A plurality of hoods 100 are attached to the housing 80 adjacent to and covering at least a portion of a respective opening 84 in the housing. Each hood 100 has an upwardly facing surface disposed at an acute angle relative to horizontal. This orientation forces the air flow to move initially in an upward direction. The orientation of the hood 100 also serves to keep relatively large moisture drops, as encountered in heavy rain or snow, from the inlet air flow.

The hoods 100 also preferably have a pair of oppositely facing sides 102 to form a relatively closed structure in which air flow is force to flow through the moisture removal device 60. Each of the moisture removal devices 60 is supported above a respective one of the hoods 100, except the uppermost hoods as viewed in FIGS. 1 and 2. The moisture removal devices 60 may be of any suitable form, such as mechanical separators such as vanes, demisters, pocket filters, bags, cartridges and the like. Any suitable material may be used to support the moisture removal devices 60, such as without limitation stainless steel or plastic.

Figure 3:
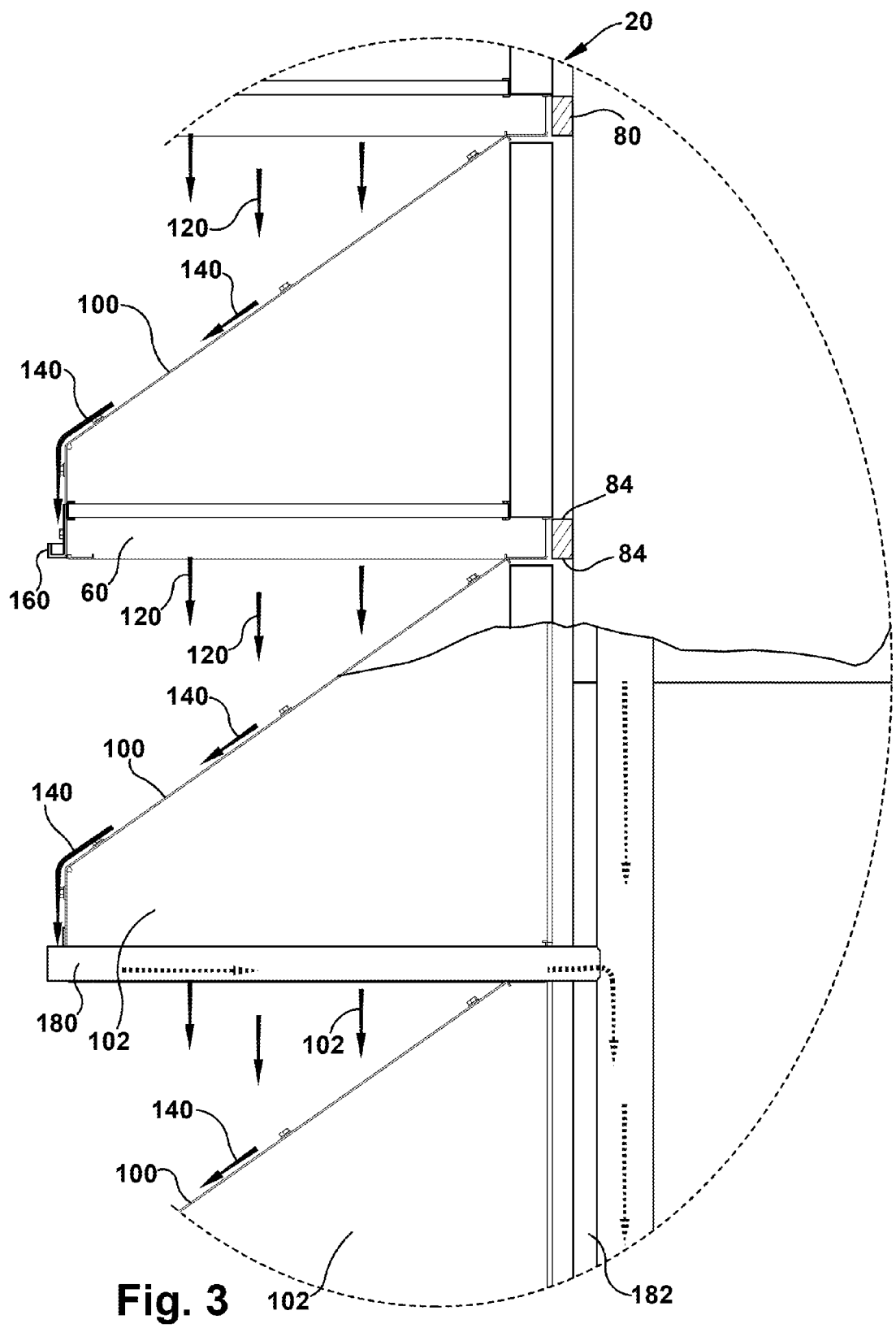
FIG. 3 is an enlarged view, partly in section, of a portion of the housing of the moisture removal system illustrated in FIG. 1.

It will further be appreciated that the orientation of the moisture removal devices 60 may be different than that shown for illustration purposes in FIGS. 1 and 3. In any event, it is desired that the moisture removal devices 60 has minimal effect on air flow through the moisture removal devices while removing as much moisture from the air flow as possible.

Each moisture removal device 60 may be in the form of a pocket filter with filtration media hydrophobic properties. One such filter media is a single layer of 100% polypropylene fiber material. It will be appreciated that other suitable materials may be used, such as a mixture of polypropylene and polyester fibers, and thermally bonded polypropylene or polyester bi-component fibers (and mixtures thereof). The media may be non-woven, air laid, carded or needle punched. The media preferably has an average thickness in the range of about 4 mm (0.157 inch) to 18 mm (0.709 inch). If the fiber material is not inherently hydrophobic, the fibers are coated to provide hydrophobic properties to the media.

The moisture removal devices 60 are made from filter media capable of separating moisture droplets from the air flowing through the preliminary filter whether in the form of heavy or light rain, fog or mist. The separated moisture droplets collect on an exterior surface of the moisture removal devices 60. Separated moisture droplets agglomerate into a relatively larger drop 120 (FIG. 3). The drop 120 has a size and mass that is not capable of being carried by the flow of inlet air. The drop 120 falls onto the hood 100 below and is directed out of the flow of inlet air by creating a stream 140 or sheet of water that runs down the upwardly facing surface of the hood 100.

The stream 140 runs to the lowermost edge of the hood 100. The stream 140 is collected in a gutter 160 attached to the lowermost edge of the hood 100. The gutter 160 is preferably in the form of an open U-shaped channel that is closed on three sides and open on a fourth upwardly facing area. The gutter 160 can be made from any suitable material and in any suitable configuration, such as a metal or plastic extruded U-shape. The gutter 160 has at least a portion angled slightly downward to allow flow in a direction laterally outward towards the sides 102 of the hoods 100. The gutter 160 collects the stream 140 of separated water and directs the collected water in a direction laterally towards the sides 102 of the hoods 100 and along the lowermost edge of the hoods. The depth of the gutter 160 is selected to assure that little or no water in the gutter may be picked up by or re-enter the flow of air into the hoods 100 and housing 80.

The air inlet system 20 also includes a plurality of conduits 180 located at the lowermost edges of sides 102 of the outer hoods 100. Each conduit 180 is fluidly connected with a respective gutter 160 to conduct water away from the gutter, the hoods 100 and the openings 84 in the housing 80. This inhibits the separated moisture from re-entering the air flow through the hoods 100 and the openings 84 in the housing 80 to the gas turbine 22. The conduits 180 are preferably closed in the form of tubing. The conduits 180 may be made of any suitable material, such as plastic of metal. The conduits 180 are preferably angled slightly downward from their first ends at location at which they fluidly connect with respective gutters 160.

The conduits 180 are also fluidly connected with a main conduit or downspout 182 at their second opposite ends. This further assures that separated moisture is inhibited the from re-entering the air flow through the hoods 100 and the openings 84 in the housing 80 to the gas turbine 22. The downspouts 182 are preferably closed in the form of tubing and of a slightly larger size than the conduits 180. The downspouts 182 may be made of any suitable material, such as plastic of metal. The downspouts 182 extend in a direction substantially downward. The downspouts 182 are illustrated as extending substantially in a vertical direction, but is will be apparent that the downspouts could be disposed at any suitable angle.

Figure 2:
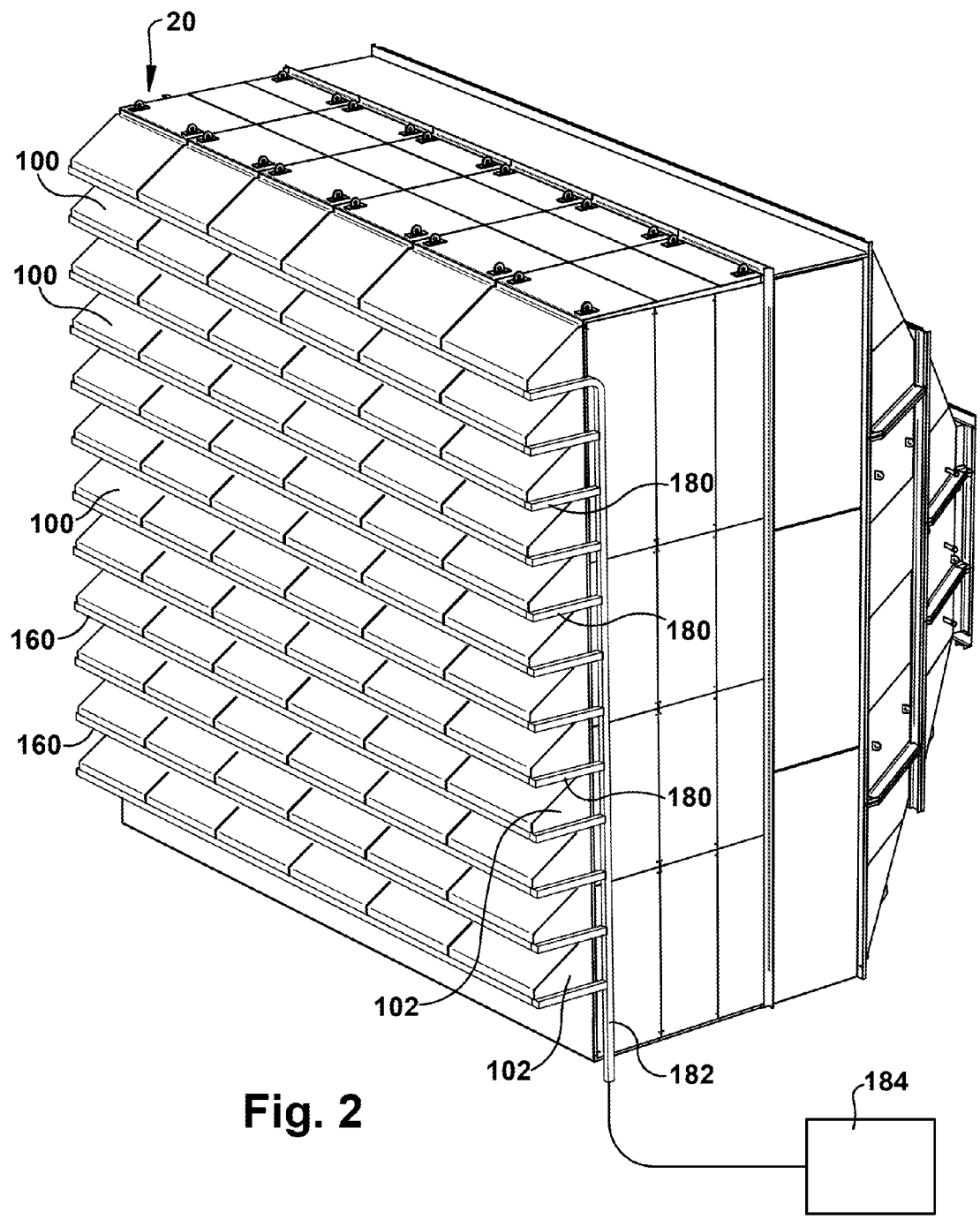
FIG. 2 is a perspective schematic view of a housing of the moisture removal system illustrated in FIG. 1.

The downspouts 182 are preferably fluidly connected with a storage location 184 (FIG. 2). The storage location 184 is preferably located remotely enough from the air inlet system 20 to assure that moisture is inhibited the from re-entering the air flow through the hoods 100 and the openings 84 in the housing 80 to the gas turbine 22. The storage location 184 can be of any suitable form, such as a permanent or temporary tank, reservoir, recycling facility or holding pond.

In general, during the method of diverting moisture from re-entering the housing 80 of the air inlet system 20 includes directing inlet air flow to moisture separating devices 60. Moisture is separated from the inlet air flow by the moisture separating devices 60. The separated moisture 120 flows down the angled surface of the hood 100 and collected in a gutter 160 disposed adjacent an edge of the hood. The separated moisture flows to at least one end of the gutter 160. The separated moisture is then conducted away from the gutter 160 and the opening 84 in the housing 80 with a conduit 180 that is fluidly connected with the gutter. The downspouts 182 then further direct the separated moisture away from the hoods 100 and the air stream entering the housing 80. This inhibits the separated moisture from re-entering the air flow through the opening 84 in the housing 80 to the gas turbine. The moisture-free inlet air flows into the interior of the hoods 100 and then into the chamber 82 through inlet openings 84 in the housing 80. The air then flows from the through the primary filters 62 to remove particulates. Air the flows out of the air inlet system 20 through the ducting 64 to the gas turbine 22.

From the above description of at least one aspect of the invention, those skilled in the art will perceive improvements, changes and modifications. Such improvements, changes and modifications within the skill of the art are intended to be covered by the appended claims.

Having described at least one aspect of the invention, what is claimed is:

1. A moisture diversion system for a gas turbine inlet, the moisture diversion system comprising:
   a housing operably connected with a gas turbine and defining an opening through which air flows to the gas turbine;
   a hood attached to the housing adjacent the opening, the hood having a surface disposed at an acute angle relative to horizontal, a front edge, and a side edge;
   a device disposed relative to the hood to separate moisture from air flowing through the device, whereby separated moisture is directed onto the hood;
   a gutter disposed adjacent the front edge of the hood to collect moisture from the hood, at least a portion of the gutter extending in a first substantially horizontal direction laterally outward toward the side edge of the hood;
   a conduit disposed adjacent the side edge of the hood and fluidly connected with the gutter, at least a portion of the conduit extending in a second substantially horizontal direction, wherein the first substantially horizontal direction is substantially perpendicular to the second substantially horizontal direction; and
   a downspout fluidly connected with the conduit, the downspout extending in a substantially downward direction, wherein the conduit and the downspout conduct water away from the gutter and the opening in the housing to inhibit separated moisture from re-entering the air flow through the opening to the gas turbine.

2. The moisture diversion system of claim 1 wherein the gutter has a channel shape cross-section to receive moisture from the hood through an open portion of the channel.

3. The moisture diversion system of claim 1 wherein the conduit has a closed tubular shape cross-section.

4. The moisture diversion system of claim 1 wherein the device is in the form of a preliminary filter made from a hydrophobic material.

5. The moisture diversion system of claim 1 wherein the device and opening are located above the hood.

6. The moisture diversion system of claim 1 wherein first substantially horizontal direction and the second substantially horizontal direction are angled slightly downward.

7. The moisture diversion system of claim 1 wherein the substantially downward direction is angled substantially vertical.

8. A method of diverting moisture from inlet air flowing to a gas turbine, the method comprising the steps of:
   providing a housing operably connected with a gas turbine and defining an opening through which air flows to the gas turbine;
   providing a hood attached to the housing adjacent the opening, the hood having a surface disposed at an acute angle relative to horizontal, a front edge, and a side edge;
   separating moisture from the air flow;
   agglomerating separated moisture into a drop so the drop falls onto the hood;
   providing a gutter disposed adjacent the front edge of the hood to collect drops of moisture from the hood, at least a portion of the gutter extending in a first substantially horizontal direction laterally outward toward the side edge of the hood;
   conducting moisture away from the gutter and the opening in the housing with a conduit disposed adjacent the side edge of the hood and fluidly connected with the gutter, at least a portion of the conduit extending in a second substantially horizontal direction, wherein the first substantially horizontal direction is substantially perpendicular to the second substantially horizontal direction and a downspout fluidly connected with the conduit, the downspout extending in a substantially downward direction, to inhibit separated moisture from re-entering the air flow through the opening to the gas turbine.

9. The method of claim 8 wherein the providing a gutter step includes providing a gutter having a channel shape cross-section to receive drops of moisture from the hood through an open portion of the channel.

10. The method of claim 9 wherein the conducting moisture away from the gutter step includes the conduit having a closed tubular shape cross-section.

11. The method of claim 8 wherein first substantially horizontal direction and second substantially horizontal direction are angled slightly downward.

12. The method of claim 8 wherein substantially downward direction is angled substantially vertical.

13. Moisture diversion structure for an inlet air system, the moisture diversion structure comprising:
   a housing defining an opening through which air flows;
   a hood attached to the housing adjacent the opening, the hood having a surface disposed at an acute angle relative to horizontal, a front edge, and a side edge;
   a device disposed above the hood to separate moisture from air flowing through the device, whereby separated moisture agglomerates into a drop incapable of being carried by the flow of air so the drop falls onto the hood;
   a gutter disposed adjacent the front edge of the hood to collect drops of moisture from the hood, at least a portion of the gutter extending in a first substantially horizontal direction laterally outward toward the side edge of the hood;
   a conduit disposed adjacent the side edge of the hood and fluidly connected with the gutter, at least a portion of the conduit extending in a second substantially horizontal direction, wherein the first substantially horizontal direction is substantially perpendicular to the second substantially horizontal direction; and a downspout fluidly connected with the conduit, the downspout extending in a substantially downward direction, wherein the conduit and the downspout conduct water away from the gutter and the opening in the housing to inhibit separated moisture from re-entering the air flow through the opening.

14. The moisture diversion structure of claim 13 wherein the device is in the form of at least one pocket filter extending in a substantially vertical direction.

15. The moisture diversion structure of claim 13 wherein the device is in the form of filter media.

16. The moisture diversion structure of claim 15 wherein the media of the device is made at least partially from a hydrophobic material.

17. The moisture diversion structure of claim 13 wherein first substantially horizontal direction and the second substantially horizontal direction are angled slightly downward.

* * * * *

UNITED STATES PATENT AND TRADEMARK OFFICE
CERTIFICATE OF CORRECTION

PATENT NO. : 8,337,597 B2
APPLICATION NO. : 13/022020
DATED : December 25, 2012
INVENTOR(S) : Chillar et al.

Page 1 of 1

It is certified that error appears in the above-identified patent and that said Letters Patent is hereby corrected as shown below:

In Column 6, Line 1, in Claim 6, delete "first" and insert -- the first --, therefor.

In Column 8, Line 7, in Claim 17, delete "first" and insert -- the first --, therefor.

Signed and Sealed this
Twelfth Day of March, 2013

Teresa Stanek Rea
*Acting Director of the United States Patent and Trademark Office*